United States Patent
Osterberg et al.

(10) Patent No.: US 6,454,063 B1
(45) Date of Patent: Sep. 24, 2002

(54) TUNED MASS DAMPER WITH TUNABLE DAMPING AND ANTI FRICTION ROLLING MASS

(75) Inventors: David A. Osterberg, Glendale; Toren S. Davis, Peoria, both of AZ (US); Conor D. Johnson, Belmont, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/153,951

(22) Filed: Sep. 16, 1998

Related U.S. Application Data

(62) Division of application No. 08/591,922, filed on Jan. 25, 1996, now Pat. No. 5,873,438.

(51) Int. Cl.[7] ................................................. F16F 7/10
(52) U.S. Cl. ........................................ 188/379; 384/126
(58) Field of Search ................................. 188/378, 379, 188/380, 298, 322.18; 181/207, 209; 244/54, 75 A, 17.27; 52/167.1; 267/33, 34, 177; 137/85; 384/125, 126, 127, 215; 212/272

(56) References Cited

U.S. PATENT DOCUMENTS

| | | | | |
|---|---|---|---|---|
| 965,838 A | * | 7/1910 | Sanborn, Jr. ............. | 267/177 X |
| 2,225,929 A | * | 12/1940 | Sarazin .................... | 181/209 X |
| 2,586,043 A | * | 2/1952 | Hodgson et al. ............ | 188/380 |
| 3,259,212 A | * | 7/1966 | Nishioka et al. ............ | 188/380 |
| 3,911,199 A | * | 10/1975 | Fischer ........................ | 174/42 |
| 3,948,499 A | * | 4/1976 | Eckersley et al. ......... | 267/34 X |
| 4,530,518 A | * | 7/1985 | Newton ....................... | 280/758 |

* cited by examiner

Primary Examiner—Pam Rodriguez
(74) Attorney, Agent, or Firm—Charles J. Ungemach

(57) ABSTRACT

A container with an inside surface and a mass mounted for oscillation in the container with a pair of bellows in the container each having a bias spring therein and a removable end to expose the interior of the bellows to exchange the spring for easy tuning of the damping characteristics and a plurality of balls, one each positioned in a plurality of troughs around the periphery of the mass proximate the ends there to bear against the inside surface so as to provide low friction oscillation of the mass in the container.

5 Claims, 2 Drawing Sheets

TUNED MASS DAMPER WITH TUNABLE DAMPING AND ANTI FRICTION ROLLING MASS

This is a divisional of application Ser. No. 08/591,922 filed Jan. 25, 1996, now U.S. Pat. No. 5,873,438.

BACKGROUND OF THE INVENTION

1. Field of the Invention

The present invention relates to tuned mass damping devices and more particularly to such dampers which may find use in reducing the periodic motion of elongated structures such as booms. The invention may have particular utility with booms mounted on satellites to hold measuring equipment the accuracy of which may be reduced due to the sway of the boom resulting from disturbances such as thermal distortion shock caused by, for example, transient thermal distortions of solar panels.

2. Description of the Prior Art

In the prior art, tuned mass dampers for reducing sway are known. Such dampers usually contain a mass mounted for movement in a container of fluid or a magnetic field and positioned by a spring. By proper selection of the mass and spring, the mass will have the same natural frequency as the boom, or other device to which the damper is mounted, so that when the boom experiences shock and begins to sway in a direction, the mass begins to vibrate or oscillate in the same direction and at substantially the same frequency. However, since the boom is an input to the damper, the damper vibrates 180 degrees out of phase with the boom, which motion tends to cancel the boom motion. Since the boom is now vibrating at an off-resonant frequency and the damper has absorbed a substantial portion of its energy, the boom displacement is much smaller and is effectively damped out by the fluid or by the magnet in the damper. Such dampers are satisfactory for high frequency vibrations but because frequency is proportional to the ratio between the square root of the spring constant to the mass, at low frequencies e.g. 1.5 hertz, the mass becomes too large for the spring and cannot be effectively supported. The result is that the mass begins to sway and move in directions other than that required for proper damping.

BRIEF DESCRIPTION OF THE PRESENT INVENTION

The present invention overcomes the problems in the prior art by providing a damper with a mass which is constrained to move in the desired direction. By making the mass cylindrical and positioning it within a housing closely adjacent the mass, motion in the fluid container in only the desired direction is permitted. The fluid may be varied to make the vibration tunable and, in fact, the present invention provides for tunable damping without having to change the fluid. The tuning of the damping is accomplished by providing a pair of bellows with changeable internal springs therein to change the volumetric stiffness of the bellows and thus provide different characteristics to the fluid expansion and contraction in the chambers surrounding the mass. Thus, in testing the damping characteristics for a particular use, only the springs internal to the bellows need be changed for fine tuning. In the event that the sliding friction between the mass and the adjacent container housing is too large, a nearly frictionless motion is provided by using a linear bearing with, for example, circulating balls. A specific improvement to the ball bearing mounting is shown in the present invention by the use of a plurality of linear troughs in the mass each of which entraps a single ball so that there is no sliding friction between the mass and the walls or between adjacent balls.

DETAILED DESCRIPTION OF THE PREFERRED EMBODIMENT

Figure 1:
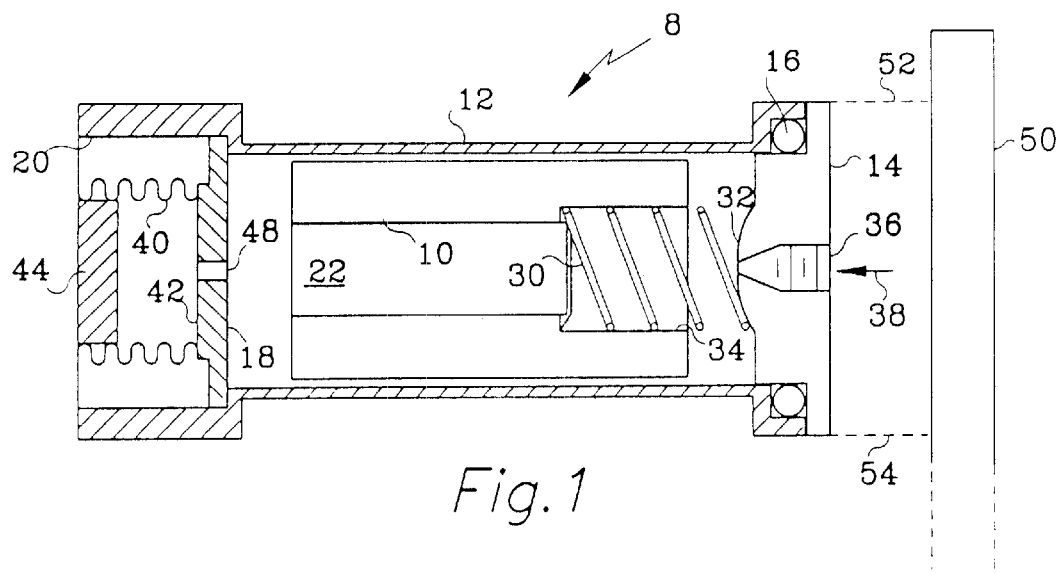
FIG. 1 shows an example of the basic tuned damper of the present invention; and, FIG. 2 shows a second embodiment of the present invention incorporating both the fine tuning of damping and reduction of friction with motion of the mass.

In FIG. 1 a damper 8 is shown comprising a hollow moveable mass 10, slideably mounted in a cylindrical container 12 having a first end piece 14 fastened to cylinder 12 by conventional means, such as bolts, not shown and sealed to prevent fluid loss by a grommet 16. A second end piece 18 is fastened at a second end in a recess 20 of cylinder 12 by conventional means such as bolts, also not shown. The cylinder 12 and end pieces 14 and 18 form a chamber 22 within which mass 10 may move back and forth.

A spring 30 of predetermined stiffness is fastened at one end thereof to a protrusion 32 of end piece 14 and at the other end thereof to a recess 34 in mass 10 so that mass 10 will be positioned by spring 30 until subjected to a force allowing mass 10 to oscillate, only horizontally, back and forth in chamber 22 at a frequency determined by the size of mass 10 and stiffness of spring 30.

The first end piece 14 has a filling port 36 therethrough which allows the introduction of a damping fluid, shown by arrow 38, into the chamber 22. After filling, port 36 is sealed in conventional manner.

At the second end of cylinder 12, in recess 20, a thermal expansion bellows 40 is connected at one end thereof to a protrusion 42 in end piece 18 and at the other end thereof to a sealing member 44. End piece 18 has a small opening 48 therethrough connecting the interior of bellows 40 to chamber 22. This allows transfer of fluid from chamber 22 to the interior of bellows 40 to accommodate expansion and contraction of the fluid under modest temperature variations.

In one application of the apparatus of FIG. 1, the damper may be used to compensate for unwanted vibrations of, for example, a boom shown in FIG. 1 by reference numeral 50. The unwanted oscillations will be transverse to the length of the boom and accordingly it is desired that the mass 10 move in the same direction, i.e. from right to left in FIG. 1. Accordingly, the damper 8 is shown mounted to boom 59 horizontally as indicated by dashed lines 52 and 54 and, as explained above, will vibrate 180 degrees out of phase with the boom to help cancel the boom motion.

For many applications, the apparatus of FIG. 1 will perform satisfactorily, but for some high accuracy or specialized uses, there may be inaccuracies or unnecessary costs associated with the FIG. 1 damper. For example, in order to provide the exactly correct amount of damping, the damping fluid 38 in chamber 20 is first chosen to have a viscosity which is believed to provide the best absorption of energy from the oscillating system and provide the desired amount of damping for the specific intended use. The boom and the damper are then tested to check the damping characteristics and, if they are not right, the fluid has to be drained and new fluid with different viscosity inserted for a re-test. This process is repeated until the desired damping characteristics of the system are obtained. Such a procedure is quite costly and time consuming and adds considerable cost to the damper.

Another difficulty with the FIG. 1 damper is a result of mass 10 sliding in chamber 22 because too much friction may be involved for optimum damping effectiveness. Conventional linear bearings may be used to reduce the friction and in some cases may be sufficient. However, even using conventional linear bearings between mass 10 and the interior of cylinder 12 there may be too much friction because of contact between the balls. These problems are overcome with the improvements of FIG. 2.

Figure 2:
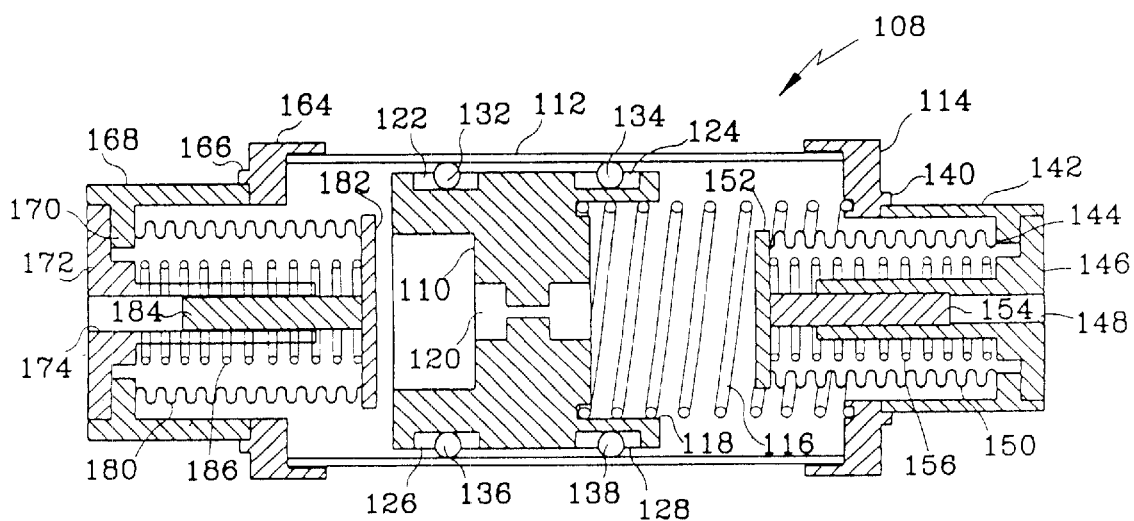

In FIG. 2, a damper 108 (which may also be attached to a boom as in FIG. 1 but not shown in FIG. 2 for simplicity) is shown comprising a moveable mass 110, slideably mounted in a cylindrical container 112 having a first cylindrical end piece 114 fastened to the right end of cylinder 112 by conventional means, not shown. A spring 116 has a first end fastened in a recess 118 of mass 110 and a second end fastened to end piece 114 so that mass 110 is positioned thereby. Mass 110 is shown having an orifice 120 extending between its left and right sides in FIG. 2 so as to permit the passage of the damping fluid therethrough. The damping fluid may be inserted in the cylindrical container 112 in a manner similar to that shown in FIG. 1. As was the case in FIG. 1, the mass 110 and the spring 116 are chosen to have the frequency of oscillation matching the particular use to which it is to be put e.g. the frequency of the boom to which it will be mounted.

Figure 3A:
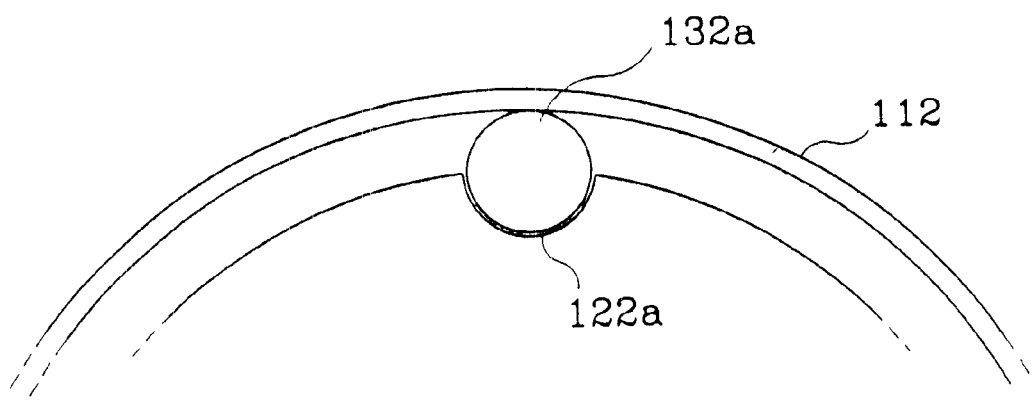
FIG. 3a shows a ball of the present invention in a semicircular groove.
Figure 3B:
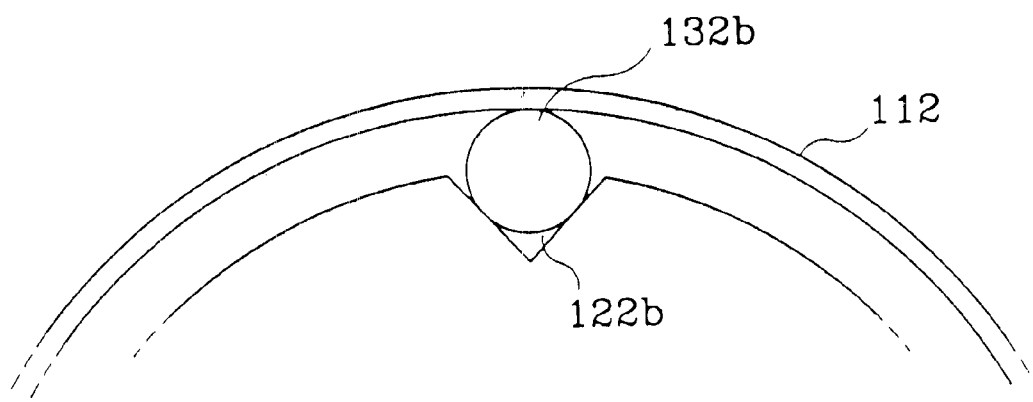
FIG. 3b shows a ball of the present invention in a "V" shaped groove.

A plurality of troughs 122, 124, 126 and 128 are shown in the outer edge of mass 110 and are cross-sectionally shaped to constrain the movement of balls such as 132, 134, 136 and 138 in all but the desired direction, horizontally in FIG. 2. For example, the grooves may be of slightly greater diameter than the balls as is shown in FIG. 3a where a semicircular groove 122a supports the ball 132a, or, as shown in FIG. 3b, may be a "V" shaped groove 122b supporting a ball 132b. In either case, the ball is constrained for motion only into and out of the plane of the paper. The plurality of balls 132, 134, 136 and 138 in the troughs 122, 124, 126 and 128 respectively engage the inner surface of cylinder 112 and provide rolling motion for mass 110. The lengths of the troughs are made to accommodate the amount of motion expected of mass 110 oscillating back and forth in use. In the event that the mass 110 moves more than expected, the balls (although moving less distance than the mass) may nevertheless reach the ends of the trough where they may encounter greater friction due to the worming effect and/or tolerance errors. However, the device is completely self centering so that when the motion decreases to the expected limits, the balls will move to the center and at rest assume the position shown in FIG. 2. This feature assures the device will remove the maximum amount of energy from the system by minimizing mass friction. There should be at least two troughs around the diameter of mass and preferably three or more to prevent any contact between the outer surface of mass 110 and the inner surface of cylinder 112. Using the balls eliminates the sliding friction between the mass 110 and the cylinder 112 and since a single ball is used, there is no friction between balls. Thus the possible excessive friction of the FIG. 1 damper has been avoided.

Cylindrical end piece 114 has an abutment 140 and a first cylindrical end member 142 is seated thereon. Cylindrical end member 142 has an inwardly extending ledge 144 and a removable end cap 146 with a hole 148 extending centrally therethrough. End cap 146 is mounted against ledge 144. A first bellows 150 has a right end which is fixed to the ledge 144 and extends to the left towards the interior of cylindrical container 112. The left end of bellows 150 is sealed to a circular plate 152 which has a central rod 154 extending back to the right so as to be guided in the hole 148. A spring 156 is positioned in the interior of bellows 150 between the circular plate 152 and the end cap 146 and provides additional volumetric stiffness to the bellows 150.

The left end of damper 108 in FIG. 2 is similar to the right end. A second cylindrical end piece 164 is fastened to the left end of cylindrical container 112 by conventional means, not shown. End piece 164 has an abutment 166 and a second cylindrical end member 168 is seated thereon. Cylindrical end member 168 has an inwardly extending ledge 170 and a removable end cap 172 with a hole 174 extending therethrough. End cap 172 is mounted against ledge 170. A second bellows 180 has a left end which is fixed to the ledge 170 and extends to the right towards the interior of cylindrical container 112. The right end of bellows 180 is sealed to a circular plate 182 which has a central rod 184 extending back to the left so as to be guided in the hole 174. A spring 186 is positioned in the interior of bellows 180 between the circular plate 182 and the end cap 172 and provides additional volumetric stiffness to the bellows 180.

It is seen that as the mass 110 moves to the right and left in FIG. 2, the fluid pushes against circular plates 152 and 182 to collapse bellows 150 or 180 against the force supplied by spring 156 or 186. The amount of damping that this provides to the system is controlled in part by the stiffness of the springs 156 and 186 so all that is needed to change or fine tune the damping effect, is to remove the end caps 146 and 172 and replace springs 156 and 186 with springs having different stiffness. Thus, testing of the damper is considerably easier, much less time consuming and less expensive than the draining and replacement of the fluid as in FIG. 1.

It is thus seen that we have provided a damper that is constrained to move only in the desired direction for proper damping at low frequencies. We have also provided a damper that is easily fine tuned and has a minimum of friction between the moving mass and the container. Although the present invention has been described with reference to preferred embodiments, workers skilled in the art will recognize that changes may be made in form and detail without departing from the spirit and scope of the invention. For example, in the event that it is desired to accommodate the damper to extreme forces, as, for example, the force exerted on the equipment upon take off from a launching site, additional springs located near the interior portions of end pieces 114 and 164 may be employed to provide a soft stop for mass 110. Also, if reduced rolling friction is desired but extreme accuracy is not required, the first and second bellows may be omitted and a single temperature compensating bellows such as shown in FIG. 1 employed. Furthermore, when the oscillations to be damped may occur in more than one plane, two dampers mounted on the member at right angles to each other may be employed.

What is claimed is:

1. Apparatus for minimizing friction between a mass having first and second ends and having an exterior surface extending along an axis and the interior surface of a container in which the mass is to oscillate comprising:
   a plurality of troughs formed in the surface of the mass, at least a first three of which being positioned around the periphery thereof proximate the first end and extending a predetermined distance along the axis and at least a second three of which being positioned around the periphery thereof proximate the second end and extending a predetermined distance along the axis; and a single ball positioned in each trough and bearing against the interior surface of the container to allow low friction oscillation of the mass in the container.

2. Apparatus according to claim 1 wherein the container and mass comprise a damper for use in damping the oscillatory motion of a member to which the damper is mounted.

3. Apparatus according to claim 2 further including a fluid of predetermined viscosity in the container on either side of the mass.

4. A low friction mounting for a damper having a mass which has first and second ends and a length, to permit relative movement between the mass and the interior surface of a tube surrounding the mass, comprising:

a first set of at least three grooves positioned about the mass near the first end and extending a predetermined distance along the length;

a second set of at least three grooves positioned about the mass near the second end and extending a predetermined distance along the length; and a single ball in each groove bearing against the interior surface to provide low friction rolling movement between the mass and the surface.

5. The mounting of claim 4 wherein the balls in the grooves are self centering.

* * * * *